United States Patent
Cao et al.

(10) Patent No.: US 12,021,193 B2
(45) Date of Patent: Jun. 25, 2024

(54) NON-AQUEOUS ELECTROLYTE INCLUDING CAGED BICYCLIC PHOSPHATE, AND LITHIUM ION BATTERY INCLUDING THE SAME

(71) Applicant: HUIZHOU CAPCHEM CHEMICALS CO., LTD, Guangdong (CN)

(72) Inventors: Zhaowei Cao, Guangdong (CN); Dejun Xiong, Guangdong (CN); Qun Chen, Guangdong (CN); Xuejun Chen, Guangdong (CN); Xiaoxia Xiang, Guangdong (CN); Jiahao Huang, Guangdong (CN)

(73) Assignee: HUIZHOU CAPCHEM CHEMICALS CO., LTD, Huizhou (CN)

( * ) Notice: Subject to any disclaimer, the term of this patent is extended or adjusted under 35 U.S.C. 154(b) by 586 days.

(21) Appl. No.: 17/290,294

(22) PCT Filed: Dec. 10, 2018

(86) PCT No.: PCT/CN2018/120007
§ 371 (c)(1),
(2) Date: Apr. 30, 2021

(87) PCT Pub. No.: WO2020/087667
PCT Pub. Date: May 7, 2020

(65) Prior Publication Data
US 2022/0021028 A1 Jan. 20, 2022

(30) Foreign Application Priority Data
Nov. 1, 2018 (CN) .......................... 201811300596.1

(51) Int. Cl.
| | |
|---|---|
| H01M 10/0567 | (2010.01) |
| H01M 4/02 | (2006.01) |
| H01M 4/505 | (2010.01) |
| H01M 4/525 | (2010.01) |
| H01M 4/58 | (2010.01) |
| H01M 10/0525 | (2010.01) |
| H01M 10/0568 | (2010.01) |
| H01M 10/0569 | (2010.01) |

(52) U.S. Cl.
CPC ....... *H01M 10/0567* (2013.01); *H01M 4/505* (2013.01); *H01M 4/525* (2013.01); *H01M 4/58* (2013.01); *H01M 10/0525* (2013.01); *H01M 10/0568* (2013.01); *H01M 10/0569* (2013.01); *H01M 2004/028* (2013.01)

(58) Field of Classification Search
CPC ......... H01M 10/0567; H01M 10/0525; H01M 10/0568; H01M 10/0569; H01M 4/505; H01M 4/525; H01M 4/58
USPC ................................ 429/188, 322, 326, 337
See application file for complete search history.

(56) References Cited

U.S. PATENT DOCUMENTS

| | | | |
|---|---|---|---|
| 3,927,150 A | 12/1975 | Schwarzenbach et al. | |
| 4,801,625 A * | 1/1989 | Parr ........................ | C08K 5/527 |
| | | | 558/74 |
| 5,633,301 A | 5/1997 | Moy et al. | |
| 2012/0244445 A1 | 9/2012 | Han et al. | |

FOREIGN PATENT DOCUMENTS

| | | | |
|---|---|---|---|
| CN | 101857805 A | | 10/2010 |
| CN | 102617645 A | | 8/2012 |
| CN | 103012848 A | | 4/2013 |
| CN | 103326068 A | | 9/2013 |
| CN | 103887562 A | | 6/2014 |
| CN | 104701578 A | | 6/2015 |
| CN | 108336407 A | | 7/2018 |
| CN | 108365265 A | * | 8/2018 |
| CN | 108365265 A | | 8/2018 |

(Continued)

OTHER PUBLICATIONS

Search report of counterpart European Patent Application No. 18938768.1 issued on Mar. 2, 2022.

(Continued)

*Primary Examiner* — Sean P Cullen

(57) ABSTRACT

Provided is a non-aqueous electrolyte for a lithium ion battery, comprising one or more compounds A represented by structure 1, wherein $R_1$ is independently selected from a halogen atom or a group containing 1-5 carbon atoms, and $R_2$ is independently selected from a group containing 0-5 carbon atoms; $X_1$ is independently selected from a phosphorus oxygen group or a phosphorus atom; $X_2$ is independently selected from an oxygen atom, a carboxylate group, a sulfonate group or a carbonate group. The non-aqueous electrolyte can improve the high-temperature cycle performance of the battery and reduce the impedance. The lithium ion battery prepared with the non-aqueous electrolyte possesses good high-temperature resistant properties and good cycle performance, which can effectively avoid the instability of the lithium ion battery under high temperature conditions and improve the high and low temperature cycle performance of the lithium ion battery.

Formula 1

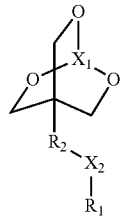

11 Claims, No Drawings

(56) References Cited

FOREIGN PATENT DOCUMENTS

| | | | |
|---|---|---|---|
| CN | 108428942 A | * | 8/2018 |
| CN | 108428942 A | | 8/2018 |
| EP | 2746288 A1 | | 6/2014 |
| EP | 3145019 A1 | | 3/2017 |
| JP | 10189040 A | * | 7/1998 |
| JP | 2000252168 A | * | 9/2000 |
| JP | 2007115583 A | | 5/2007 |
| WO | 9741173 A1 | | 11/1997 |

OTHER PUBLICATIONS

International Search Report of PCT Patent Application No. PCT/CN2018/120007 issued on May 30, 2019.

* cited by examiner

NON-AQUEOUS ELECTROLYTE INCLUDING CAGED BICYCLIC PHOSPHATE, AND LITHIUM ION BATTERY INCLUDING THE SAME

TECHNICAL FIELD

The application relates to a non-aqueous electrolyte for a lithium ion battery and a lithium ion battery.

BACKGROUND

Lithium ion batteries are widely used in various portable electronic products and communication tools because of their advantages of high energy density, low self-discharge, no memory effect, long cycle life, wide working temperature range and high safety level. With the country vigorously advocating new energy and low-carbon economy, the demand for lithium ion batteries in new energy electric vehicles and energy storage equipment is growing rapidly, which leads to a broader application prospect of lithium ion batteries in the future new energy field.

For non-aqueous electrolyte lithium ion battery, the non-aqueous electrolyte, as the medium of lithium ion transmission and current conduction between positive and negative electrodes, is the main factor that determines the high and low-temperature performances of the battery. The additives of electrolyte can significantly improve the capacity retention rate and cycle life of lithium ion battery by improving the quality of SEI films. During the first charging process, the additives would firstly undergo reduction and decomposition reaction on the negative electrode surface to produce lithium alkoxy, lithium carbonate, lithium sulfonate and other substances, forming a good passive SEI film. The dense SEI film is insoluble in electrolyte and has good thermal and chemical stability. It allows lithium ions to enter and exit the electrode freely, while preventing solvent molecules from entering, thus inhibiting the damage of solvent molecules to the electrode and improving the cycle efficiency and reversible capacity of the battery.

In order to improve the performances of lithium ion battery, many researchers have tried to add various additives, such as vinylene carbonate, fluoroethylene carbonate and vinylethylene carbonate, to improve the performances of battery. However, at present, it is difficult to give consideration to the high temperature performance and low impedance performance of the battery by adding conventional additives to electrolyte. With the wider application of lithium ion battery in different fields, the market puts forward higher requirements for high energy density and high safety performance of lithium-ion battery. According to the prior art, the charging and discharging performance of the battery can be improved by adding phosphate ester, vinylene carbonate derivatives and other specific carbonate into the electrolyte. The self-extinguishing properties of the electrolyte can be improved by adding caged bicyclic phosphate, but the high and low temperature cycle performance and the internal resistance reduction of the battery are not obviously improved. Therefore, it is necessary to further develop a method to effectively improve the high-temperature cycle performance of high-voltage lithium ion batteries and reduce the impedance at the same time, so as to solve the problems of poor high-temperature cycle performance and high impedance of batteries caused by their instability at high temperature.

SUMMARY

The application provides a non-aqueous electrolyte for a lithium ion battery, which can further improve the high-temperature cycle performance of battery and reduce impedance. The invention also provides a lithium ion battery comprising the said non-aqueous electrolyte.

According to a first aspect of the application, the application provides a non-aqueous electrolyte for a lithium ion battery, comprising one or more compounds A represented by formula 1,

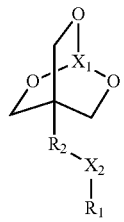

Formula 1 wherein $R_1$ is independently selected from a halogen atom or a group containing 1-5 carbon atoms, and $R_2$ is independently selected from a group containing 0-5 carbon atoms; $X_1$ is independently selected from a phosphorus oxygen group or a phosphorus atom; $X_2$ is independently selected from an oxygen atom, a carboxylate group, a sulfonate group or a carbonate group.

Furthermore, $R_1$, the group containing 1-5 carbon atoms is selected from a hydrocarbyl group, a halogenated hydrocarbyl group, an oxygen-containing hydrocarbyl group, a silicon-containing hydrocarbyl group or a cyano-substituted hydrocarbyl group; and $R_2$, the group containing 0-5 carbon atoms is selected from a hydrocarbyl group.

Furthermore, $R_1$ is independently selected from a fluorine atom, a methyl group, an alkylene group, an alkyne group, a phenyl group, a trimethylsiloxy group, a cyano group or a tricyanomethyl group.

Furthermore, the compound A is selected from compounds represented by formulas 11 to 18.

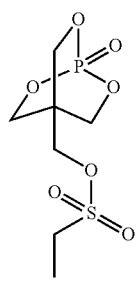

Formula 11

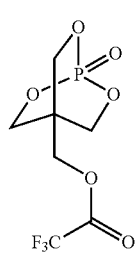

Formula 12

Formula 13

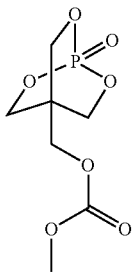

Formula 14

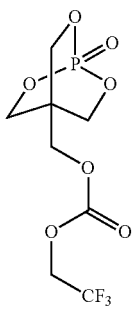

Formula 15

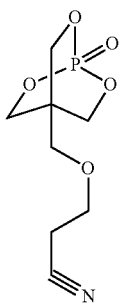

Formula 16

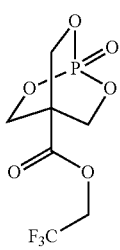

Formula 17

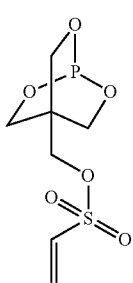

Formula 18

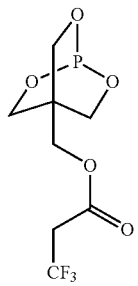

Furthermore, the content of the compound A is 0.1%-5% based on the total mass of the non-aqueous electrolyte for a lithium ion battery being 100%.

Furthermore, the non-aqueous electrolyte for a lithium ion battery comprises one or more of 1,3-propane sultone, 1,4-butane sultone and 1,3-propene sultone; preferably, the non-aqueous electrolyte for a lithium ion battery further comprises one or more of vinylene carbonate, vinylethylene carbonate and fluoroethylene carbonate.

Furthermore, the non-aqueous electrolyte for a lithium ion battery comprises a lithium salt and a non-aqueous organic solvent, wherein the lithium salt is selected from one or more of $LiPF_6$, $LiBF_4$, LiBOB, LiDFOB, $LiSbF_6$, $LiAsF_6$, $LiN(SO_2CF_3)_2$, $LiN(SO_2C_2F_5)_2$, $LiC(SO_2CF_3)_3$ or $LiN(SO_2F)_2$, the lithium salt accounts for 0.1%-15% of the total mass of the non-aqueous electrolyte; the non-aqueous organic solvent is a mixture of cyclic carbonate and chain carbonate, wherein the cyclic carbonate is selected from one or more of ethylene carbonate, propylene carbonate or butylene carbonate, and the chain carbonate is selected from one or more of dimethyl carbonate, diethyl carbonate, methyl ethyl carbonate or methyl propyl carbonate.

According to a second aspect of the present application, the present application provides a lithium ion battery, comprising a positive electrode, a negative electrode and a separator interposed between the positive electrode and the negative electrode, and the lithium ion battery comprises the said non-aqueous electrolyte for a lithium ion battery.

Furthermore, the positive electrode comprises a positive electrode active material selected from one or more of $LiCoO_2$, $LiNiO_2$, $LiMn_2O_4$, $LiCo_{1-y}M_yO_2$, $LiNi_{1-y}M_yO_2$, $LiMn_{2-y}M_yO_4$ or $LiNi_xCo_yMn_zM_{1-x-y-z}O_2$, and M is selected from one or more of Fe, Co, Ni, Mn, Mg, Cu, Zn, Al, Sn, B, Ga, Cr, Sr, V or Ti, $0 \leq y \leq 1$, $0 \leq x \leq 1$, $0 \leq z \leq 1$, $x+y+z \leq 1$.

Furthermore, the positive electrode active material is selected from $LiFe_{1-x}M_xPO_4$, and M is selected from one or more of Mn, Mg, Co, Ni, Cu, Zn, Al, Sn, B, Ga, Cr, Sr, V or Ti, $0 \leq x < 1$.

The non-aqueous electrolyte for a lithium ion battery provided by the present application contains compound A. During the first charging process, the structure of caged bicyclic phosphate derivatives in the compound A molecules would undergo reductive decomposition reaction with solvent molecules first, and the reaction product would form a passivation film on the electrode surface, which can inhibit further decomposition of the solvent molecules. $X_2$ in the structure of caged bicyclic phosphate derivatives easily leads to decomposition of bicyclic phosphate, which makes the passivation film formed on the negative electrode more stable than that formed with other phosphate esters. In addition, because the formed passivation film can effectively prevent further decomposition of solvent molecules and lithium salt molecules, the high-temperature cycle performance can be obviously improved and the high impedance problem can be ameliorated.

The lithium ion battery provided by the present application contains the above-described non-aqueous electrolyte for a lithium ion battery, which can effectively solve the cycle performance problem of the lithium ion battery, improve the high and low temperature cycle performances and reduce the internal resistance.

DETAILED DESCRIPTION OF THE DISCLOSED EMBODIMENTS

In order to make the technical problems to be solved, technical solutions and beneficial effects of the present application clearer, the present application will be further described in detail with reference to the following embodiments. It should be understood that the specific embodiments described herein are only used to explain the present application, and not intended to limit the present application.

An embodiment of the present application discloses a non-aqueous electrolyte for a lithium ion battery, which comprises a solvent, a lithium salt, a non-aqueous solvent, an additive, and one or more compounds A represented by formula 1,

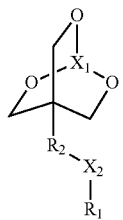

Formula 1

The non-aqueous electrolyte for a lithium ion battery comprises the compound represented by formula 1, and its working mechanism is as follows: during the first charging process, the structure of caged bicyclic phosphate derivatives in the molecule of formula 1 would undergo a reductive decomposition reaction with the solvent molecules first, and the reaction product would form a passivation film on the electrode surface, which can inhibit further decomposition of the solvent molecules. $X_2$ in the structure of caged bicyclic phosphate derivatives easily leads to the decomposition of bicyclic phosphate ester, which makes the passivation film formed on the negative electrode of the battery more stable than that formed with other phosphate esters. In addition, because the formed passivation film can effectively prevent further decomposition of solvent molecules and lithium salt molecules, the high-temperature cycle performance can be obviously improved and the high impedance problem can be ameliorated.

In some embodiments, $R_1$ is independently selected from a halogen atom or a group containing 1-5 carbon atoms, and $R_2$ is independently selected from a group containing 0-5 carbon atoms; $X_1$ is independently selected from a phosphorus oxygen group or a phosphorus atom; $X_2$ is independently selected from an oxygen atom, a carboxylate group, a sulfonate group or a carbonate group.

It should be further explained that when $R_1$ is independently selected from the group containing carbon atoms, it is preferable that the number of carbon atoms is less than 5 (including 5). Groups containing less than 5 carbon atoms can reduce the impedance of battery and give consideration to high-temperature performance and low-temperature performance. If a group containing more than 6 carbon atoms is used as a substituent, it will increase the battery impedance and adversely affect the high-temperature performance and inflation suppression. Therefore, the group containing more than 6 carbon atoms would not selected as a substituent in the present application. In the present application, the optional groups containing 1-5 carbon atoms are preferably a hydrocarbyl group, halogenated hydrocarbyl group, oxygen-containing hydrocarbyl group, silicon-containing hydrocarbyl group or cyano-substituted hydrocarbyl group, for example, in some preferred embodiments of the present application, a fluorine atom or a trichloromethyl group are preferred option. In other preferred embodiments of the present application, $R_1$ is independently selected from a methyl group, an alkylene group, an alkyne group, a phenyl group, a trimethylsiloxy group, a cyano group, a tricyanomethyl group, a cyano group, a hydrocarbyl group of hydrogen atom or fluorine atom, and an unsaturated hydrocarbyl group.

Exemplarily, compound A represented by formula 1 are shown in Table 1, but are not limited thereto.

TABLE 1

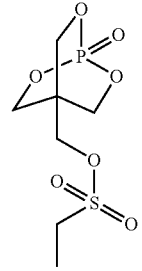 [SMILES: CCS(=O)(=O)OCC12COP(=O)(OC1)OC2]

Formula 11

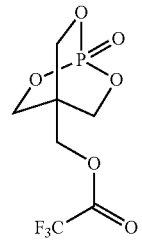 [SMILES: O=C(OCC12COP(=O)(OC1)OC2)C(F)(F)F]

Formula 12

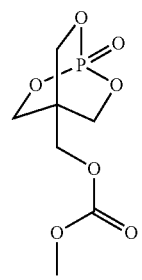

Formula 13

TABLE 1-continued

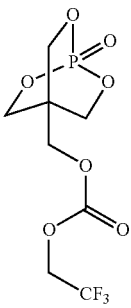 [SMILES: O=C(OCC(F)(F)F)OCC12COP(=O)(OC1)OC2]

Formula 14

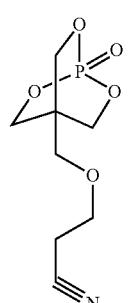

Formula 15

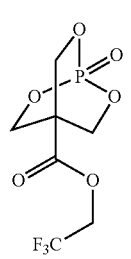

Formula 16

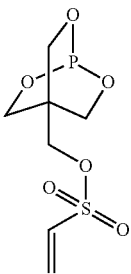

Formula 17

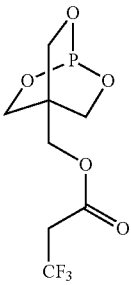

Formula 18

Controlling the content of the compounds represented by Formula 1 in the non-aqueous electrolyte has a favorable influence on further optimization of high-temperature performance and low-temperature performance. In a preferred embodiment of the present application, the content of the compounds represented by Formula 1 is 0.1%-5% based on the total mass of the non-aqueous electrolyte for a lithium ion battery being 100%. When it was lower than 0.1%, the compound content in the electrolyte is too low to form a complete passivation film on the negative electrode surface, which made it difficult to effectively improve the high-temperature performance of the non-aqueous electrolyte battery, and the internal resistance of the battery was not significantly reduced. When the content exceeded 5.0%, the SEI passivation film formed on the negative electrode surface is likely to be thick, which increased the internal resistance of the battery, and the capacity retention rate of the battery deteriorated obviously.

Additives, such as one or more selected from 1,3-propane sultone (1,3-PS), 1,4-butane sultone (BS) and 1,3-propene sultone (PST), may be added to the non-aqueous electrolyte for a lithium ion battery of the present application, and vinylene carbonate (VC), vinylethylene carbonate (VEC) and fluoroethylene carbonate (FEC) may be further preferred. These additives can form a more stable SEI film on the surface of graphite negative electrode, thus significantly improving the cycle performance of lithium ion battery. These additives may be added in amounts generally added in the art, for example, 0.1%-5.0%, preferably 0.2%-3.0%, and more preferably 0.5%-2.0%, based on the total mass of the non-aqueous electrolyte being 100%.

The experimental data show that the additive provided by the application can achieve better effects when used in combination with the above-mentioned additives than when used alone. It is speculated that there is a synergistic effect between them. That is, the additive provided by the application works synergistically with the above-mentioned additive to jointly improve the high and low temperature cycle performances of the high-voltage battery and reduce the battery impedance.

In some embodiments, the lithium salt is selected from one or more of $LiPF_6$, $LiBF_4$, LiBOB, LiDFOB, $LiSbF_6$, $LiAsF_6$, $LiN(SO_2CF_3)_2$, $LiN(SO_2C_2F_5)_2$, $LiC(SO_2CF_3)_3$ or $LiN(SO_2F)_2$. Preferably, the lithium salt is selected from $LiPF_6$, or a mixture of $LiPF_6$ and other lithium salts, and the content of the lithium salt can be varied in a wide range. Preferably, the lithium salt accounts for 0.1%-15% of the total mass of the non-aqueous electrolyte for a lithium ion battery.

The non-aqueous organic solvent is a mixture of cyclic carbonate and chain carbonate.

In a more preferred embodiment, the cyclic carbonate comprises one or more of ethylene carbonate, propylene carbonate or butylene carbonate, and the chain carbonate comprises one or more of dimethyl carbonate, diethyl carbonate, methyl ethyl carbonate or methyl propyl carbonate.

Another embodiment of the present application provides a lithium ion battery, which comprises a positive electrode, a negative electrode and the non-aqueous electrolyte for a lithium ion battery as described above.

The positive electrode includes a positive electrode active material.

In some embodiments, the positive electrode active material includes one or more of $LiFe_{1-x}M_xO_4$, $LiCoO_2$, $LiNiO_2$, $LiMn_2O_4$, $LiCo_{1-y}M_yO_2$, $LiNi_{1-y}M_yO_2$, $LiMn_{2-y}M_yO_4$ or $LiNi_xCo_yMn_zM_{1-x-y-z}O_2$, and M is selected from one or more of Fe, Co, Ni, Mn, Mg, Cu, Zn, Al, Sn, B, Ga, Cr, Sr, V or Ti, $0 \leq y \leq 1$, $0 \leq x \leq 1$, $0 \leq z \leq 1$, $x+y+z \leq 1$.

The positive electrode further comprises a current collector for extracting current, and the positive electrode active material covers the current collector.

The negative electrode further comprises a current collector for extracting current, and the negative electrode active material covers the current collector.

In some embodiments, a separator is further arranged between the positive electrode and the negative electrode, and the separator is a conventional separator in the field of lithium ion batteries.

In an embodiment, the positive electrode material is $LiNi_{0.5}Co_{0.2}Mn_{0.3}O_2$, and the negative electrode material is artificial graphite.

The lithium ion battery provided by the embodiment of the present application can effectively solve the cycle performance problem of the lithium ion battery, improve the high and low temperature cycle performances and reduce the internal resistance.

The present application will be described in detail with specific embodiments below. It should be understood that these embodiments are only exemplary and do not constitute a limitation on the protection scope of the present application.

Embodiment 1

The embodiment is used for explaining the non-aqueous electrolyte for a lithium ion battery, the lithium ion battery and the preparation method thereof disclosed by the application, and includes the following steps:
1) Preparation of the Non-Aqueous Electrolyte:

Ethylene carbonate (EC), diethyl carbonate (DEC) and ethyl methyl carbonate (EMC) were mixed according to the mass ratio of EC:DEC:EMC=1:1:1, then lithium hexafluorophosphate ($LiPF_6$) was added until the molar concentration was 1 mol/L. With the total weight of the non-aqueous electrolyte as 100%, the components with the mass percentage shown in embodiment 1 in Table 2 were added.
2) Preparation of Positive Plate:

Positive electrode active material lithium nickel cobalt manganese oxide ($LiNi_{0.5}Co_{0.2}Mn_{0.3}O_2$), conductive carbon black Super-P™ and binder polyvinylidene fluoride (PVDF) were mixed according to the mass ratio of 93:4:3, and then dispersed in N-methyl-2-pyrrolidone (NMP) to obtain a positive electrode slurry. The slurry was evenly coated on both sides of aluminum foil, then dried, calendered and vacuum dried, and the aluminum leads were welded by ultrasonic welder to obtain a positive plate. The thickness of the positive plate was 120~150 μm.
3) Preparation of Negative Plate:

Negative electrode active material artificial graphite, conductive carbon black Super-P™, binder styrene butadiene rubber (SBR) and carboxymethyl cellulose (CMC) were mixed according to the mass ratio of 94:1:2.5:2.5, and then dispersed in deionized water to obtain negative electrode slurry. The slurry was evenly coated on both sides of copper foil, then dried, calendered and vacuum dried, and the nickel leads were welded by ultrasonic welder to obtain a negative plate. The thickness of the negative plate was 120~150 μm.
4) Preparation of Battery Core A three-layer separator with a thickness of 20 μm was placed between the positive plate and the negative plate. The positive plate, negative plate and separator formed a sandwich structure, which was wound, flattened, placed in an aluminum foil, and vacuum baked at 75° C. for 48 hours to obtain the battery core to be filled with liquid.
5) Injection and Formation of Battery Core In a glove box with the dew point controlled below −40° C., the electrolyte prepared above was injected into the battery core, and the battery core was vacuum packaged and let stand for 24 h.

Then, according to the following steps, the formation of the first charging was carried out: 0.05 C current charging for 180 min, 0.2 C constant current charging to 3.95V, vacuum sealing for the second time, 0.2 C constant current charging to 4.2V, standing at room temperature for 24 hr, and 0.2 C constant current discharging to 3.0V, a $LiNi_{0.5}Co_{0.2}Mn_{0.3}O_2$/artificial graphite lithium ion battery was obtained.

Embodiment 2

As shown in Table 2, except that Compound 1 (1.0%) was replaced by Compound 2 (1.0%) for the preparation of the non-aqueous electrolyte, the other materials and steps were the same as those of Embodiment 1. The test results of high-temperature performance and low-temperature performance are shown in Table 3.

Embodiment 3

As shown in Table 2, except that Compound 1 (1.0%) was replaced by Compound 3 (1.0%) for the preparation of the non-aqueous electrolyte, the other materials and steps were the same as those of Embodiment 1. The test results of high-temperature performance and low-temperature performance are shown in Table 3.

Embodiment 4

As shown in Table 2, except that Compound 1 (1.0%) was replaced by Compound 4 (1.0%) for the preparation of the non-aqueous electrolyte, the other materials and steps were the same as those of Embodiment 1. The test results of high-temperature performance and low-temperature performance are shown in Table 3.

Embodiment 5

As shown in Table 2, except that Compound 1 (1.0%) was replaced by Compound 5 (1.0%) for the preparation of the non-aqueous electrolyte, the other materials and steps were the same as those of Embodiment 1. The test results of high-temperature performance and low-temperature performance are shown in Table 3.

Embodiment 6

As shown in Table 2, except that Compound 1 (1.0%) was replaced by Compound 6 (1.0%) for the preparation of the non-aqueous electrolyte, the other materials and steps were the same as those of Embodiment 1. The test results of high-temperature performance and low-temperature performance are shown in Table 3.

Embodiment 7

As shown in Table 2, except that Compound 1 (1.0%) was replaced by Compound 7 (1.0%) for the preparation of the non-aqueous electrolyte, the other materials and steps were the same as those of Embodiment 1. The test results of high-temperature performance and low-temperature performance are shown in Table 3.

Embodiment 8

As shown in Table 2, except that Compound 1 (1.0%) was replaced by Compound 8 (1.0%) for the preparation of the non-aqueous electrolyte, the other materials and steps were the same as those of Embodiment 1. The test results of high-temperature performance and low-temperature performance are shown in Table 3.

Comparative Example 1

As shown in Table 2, except that Compound 1 (1.0%) and vinylene carbonate (1.0%) were not added for the preparation of the non-aqueous electrolyte, the other materials and steps were the same as those of Embodiment 1. The test results of high-temperature performance and low-temperature performance are shown in Table 3.

Comparative Example 2

As shown in Table 2, except that Compound 1 (1.0%) was replaced by fluoroethylene carbonate (FEC) (1.0%) for the preparation of the non-aqueous electrolyte, the other materials and steps were the same as those of Embodiment 1. The test results of high-temperature performance and low-temperature performance are shown in Table 3.

Comparative Example 3

As shown in Table 2, except that Compound 1 (1.0%) was replaced by vinylethylene carbonate (VEC) (1.0%) for the preparation of the non-aqueous electrolyte, the other materials and steps were the same as those of Embodiment 1. The test results of high-temperature performance and low-temperature performance are shown in Table 3.

Comparative Example 4

As shown in Table 2, except that Compound 1 (1.0%) was replaced by ethylene carbonate (EC) (1.0%) for the preparation of the non-aqueous electrolyte, the other materials and steps were the same as those of Embodiment 1.

TABLE 2

| Embodiment/ Comparative example | Compound additives and contents | Other additives and contents |
|---|---|---|
| Embodiment 1 | Compound 11: 1.0% | — |
| Embodiment 2 | Compound 12: 1.0% | — |
| Embodiment 3 | Compound 13: 1.0% | — |
| Embodiment 4 | Compound 14: 1.0% | — |
| Embodiment 5 | Compound 15: 1.0% | — |
| Embodiment 6 | Compound 16: 1.0% | — |
| Embodiment 7 | Compound 17: 1.0% | — |
| Embodiment 8 | Compound 18: 1.0% | — |
| Comparative example 1 | — | — |
| Comparative example 2 | — | FEC: 1.0% |
| Comparative example 3 | — | VEC: 1.0% |
| Comparative example 4 | — | EC: 1.0% |

The $LiNi_{0.5}Co_{0.2}Mn_{0.3}O_2$/artificial graphite lithium ion batteries prepared in the above Embodiments 1 to 8 and Comparative examples 1 to 4 were tested for performances, and the test indexes and test methods are as follows:

1) Test for High-Temperature Cycle Performance

The battery was put in an oven with a constant temperature of 45° C., charged to 4.2V with a constant current of 1 C, then charged with a constant voltage until the current dropped to 0.02 C, and then discharged to 3.0V with a constant current of 1 C, and then cycled, the discharge capacity of the first cycle and the discharge capacity of the last cycle were recorded, and the capacity retention rate of high-temperature cycle was calculated according to the following formula:

Capacity retention rate=Discharge capacity of the last cycle/Discharge capacity of the first cycle*100%

2) Test for High-Temperature Storage Performance

The formed battery was charged to 4.2V with constant current and constant voltage of 1 C at normal temperature, and the first discharge capacity and initial thickness of the battery were measured. After being stored at 60° C. for 30 days, the battery was discharged to 3V at 1 C, and the retention capacity, recovery capacity and thickness of the battery after storage were measured. The calculation formulas are as follows:

Capacity retention rate (%)=Retention capacity/Initial capacity*100%;

Capacity recovery rate (%)=Recovery capacity/initial capacity*100%;

Thickness expansion rate (%)=(Thickness after storage−Initial thickness)/Initial thickness*100%.

3) Test for Low-Temperature Performance

At 25° C., the formed battery was charged to 4.2V with 1 C constant current and constant voltage, then discharged to 3.0V with 1 C constant current, and the discharge capacity was recorded. Then the battery was charged to 4.2V with constant current and constant voltage at 1 C, let stand at −20° C. for 12 h, then discharged to 3.0V with constant current at 0.2 C, and the discharge capacity was recorded.

Low-temperature discharge efficiency at −20° C.=0.2 C discharge capacity (−20° C.)/1 C discharge capacity (25° C.)*100%.

The test results of high-temperature performance and low-temperature performance are shown in Table 3.

TABLE 3

| Embodiment/ Comparative example | The 500th cycle capacity retention rate (%) at 45° C. 1 C | After 30 days of storage at 60° C. | | | -Discharge efficiency at −20° C. 0.2 C |
|---|---|---|---|---|---|
| | | Capacity retention rate | Capacity recovery rate | Thickness expansion rate | |
| Embodiment 1 | 86.8% | 82.4% | 84.7% | 10.2% | 80.1% |
| Embodiment 2 | 87.5% | 78.3% | 82.3% | 12.1% | 80.6% |
| Embodiment 3 | 86.4% | 81.0% | 83.6% | 11.8% | 75.2% |
| Embodiment 4 | 86.1% | 79.2% | 81.9% | 11.3% | 79.9% |
| Embodiment 5 | 87.9% | 80.8% | 82.1% | 10.5% | 75.3% |
| Embodiment 6 | 86.6% | 81.4% | 84.9% | 10.8% | 77.5% |
| Embodiment 7 | 87.9% | 80.4% | 81.1% | 11.8% | 78.2% |
| Embodiment 8 | 88.7% | 84.1% | 86.2% | 11.4% | 79.7% |
| Comparative example 1 | 74.5% | 67.8% | 71.2% | 19.1% | 67% |
| Comparative example 2 | 81.2% | 77.9% | 82.1% | 30.7% | 74.2% |
| Comparative example 3 | 81.8% | 78.6% | 82.9% | 13.2% | 61.4% |
| Comparative example 4 | 82.1% | 78.2% | 81.9% | 26.9% | 62.8% |

Comparing the test results of Embodiments 1-8 and Comparative examples 1-4, it can be seen that adding compounds 1-8 (1.0%) in non-aqueous electrolyte can significantly improve the high-temperature performance and inflation of lithium ion batteries compared with adding fluoroethylene carbonate (FEC), vinylethylene carbonate (VEC) and ethylene carbonate (EC).

Embodiment 9

As shown in Table 4, except that Compound 1 (1.0%) was replaced by Compound 1 (0.1%) for the preparation of the non-aqueous electrolyte, the other materials and steps were the same as those of Embodiment 1. The test results of high-temperature performance and low-temperature performance are shown in Table 5.

Embodiment 10

As shown in Table 4, except that Compound 1 (1.0%) was replaced by Compound 1 (2.0%) for the preparation of the non-aqueous electrolyte, the other materials and steps were the same as those of Embodiment 1. The test results of high-temperature performance and low-temperature performance are shown in Table 5.

Embodiment 11

As shown in Table 4, except that Compound 1 (1.0%) was replaced by Compound 1 (3.0%) for the preparation of the non-aqueous electrolyte, the other materials and steps were the same as those of Embodiment 1. The test results of high-temperature performance and low-temperature performance are shown in Table 5.

Embodiment 12

As shown in Table 4, except that Compound 1 (1.0%) was replaced by Compound 1 (5.0%) for the preparation of the non-aqueous electrolyte, the other materials and steps were the same as those of Embodiment 1. The test results of high-temperature performance and low-temperature performance are shown in Table 5.

TABLE 4

| Embodiment | Compound additives and contents | Other additives and contents |
|---|---|---|
| Embodiment 9 | Compound 11: 0.1% | — |
| Embodiment 10 | Compound 11: 2% | — |
| Embodiment 11 | Compound 11: 3% | — |
| Embodiment 12 | Compound 11: 5% | — |

TABLE 5

| Embodiment/ Comparative example | The 500th cycle capacity retention rate (%) at 45° C. 1 C | After 30 days of storage at 60° C. | | | Discharge efficiency at −20° C. 0.2 C |
| | | Capacity retention rate | Capacity recovery rate | Thickness expansion rate | |
|---|---|---|---|---|---|
| Embodiment 9 | 84.4% | 80.2% | 80.3% | 12.1.0% | 75.9% |
| Embodiment 10 | 86.1% | 81.3% | 82.4% | 11.2% | 79.5% |
| Embodiment 11 | 85.8% | 80.7% | 81.6% | 11.6% | 77.8% |
| Embodiment 12 | 82.3% | 78.6% | 79.8% | 12.2% | 75.1% |

Comparing the test results of Embodiments 9-12, it can be seen that compared with the non-aqueous electrolyte with the addition of 2% or 3% of Compound 1, the high-temperature performance and low-temperature performance of the lithium ion battery prepared with the addition of 0.1% or 5% of Compound 1 were slightly deteriorated. It shows that too little or too much content will lead to the deterioration of high-temperature performance and low-temperature performance of lithium ion battery.

Embodiment 13

As shown in Table 6, except that Fluoroethylene carbonate (FEC) (1.0%) was added for the preparation of the non-aqueous electrolyte, the other materials and steps were the same as those of Embodiment 1. The test results of high-temperature performance and low-temperature performance are shown in Table 7.

Embodiment 14

As shown in Table 6, except that vinylethylene carbonate (VEC) (1.0%) was added for the preparation of the non-aqueous electrolyte, the other materials and steps were the same as those of Embodiment 1. The test results of high-temperature performance and low-temperature performance are shown in Table 7.

Embodiment 15

As shown in Table 6, except that ethylene carbonate (EC) (1.0%) was added for the preparation of the non-aqueous electrolyte, the other materials and steps were the same as those of Embodiment 1. The test results of high-temperature performance and low-temperature performance are shown in Table 7.

TABLE 6

| Embodiment/ Comparative example | Compound additives and contents | Other additives and contents |
|---|---|---|
| Embodiment 13 | Compound 11: 1.0% | FEC: 1.0% |
| Embodiment 14 | Compound 11: 1.0% | VEC: 1.0% |
| Embodiment 15 | Compound 11: 1.0% | EC: 1.0% |
| Comparative example 2 | — | FEC: 1.0% |
| Comparative example 3 | — | VEC: 1.0% |
| Comparative example 4 | — | EC: 1.0% |

TABLE 7

| Embodiment/ Comparative example | The 500th cycle capacity retention rate (%) at 45° C. 1 C | After 30 days of storage at 60° C. | | | Discharge efficiency at −20° C. 0.2 C |
| | | Capacity retention rate | Capacity recovery rate | Thickness expansion rate | |
|---|---|---|---|---|---|
| Embodiment 13 | 87.5% | 83.1% | 85.2% | 11.0% | 80.6% |
| Embodiment 14 | 88.9% | 85.6% | 86.2% | 10.5% | 81.1% |
| Embodiment 15 | 88.3% | 84.5% | 85.7% | 11.4% | 80.9% |
| Comparative example 2 | 81.2% | 77.9% | 82.1% | 30.7% | 74.2% |
| Comparative example 3 | 81.8% | 78.6% | 82.9% | 13.2% | 61.4% |
| Comparative example 4 | 82.1% | 78.2% | 81.9% | 26.9% | 62.8% |

Comparing the test results of Embodiments 13-15 and Comparative examples 2-4, it can be seen that the high-temperature performance and inflation of lithium ion battery can be further optimized and improved by adding the additives provided by the present application.

To sum up, the additives provided by the present application can effectively improve the high-temperature performance and reduce the internal resistance of lithium ion battery on the basis of adding additives such as vinylene carbonate, vinylethylene carbonate or fluoroethylene carbonate. In addition, the other performances can be further optimized.

The above descriptions are only preferred embodiments and are not intended to limit the present invention. Any modifications, equivalent substitutions and improvements made within the spirit and principles of the present invention shall be included within the scope of protection of the present invention. Further, unless otherwise required by context, singular terms shall include pluralities and plural terms shall include the singular.

What is claimed is:

1. A non-aqueous electrolyte for a lithium ion battery, comprising one or more compounds A represented by formula 1,
    wherein $R_1$ is independently selected from a halogen atom or a group containing 1-5 carbon atoms, and $R_2$ is independently selected from a group containing 0-5 carbon atoms; $X_1$ is independently selected from a phosphorus oxygen group or a phosphorus atom; $X_2$ is selected from a sulfonate group; or
    $R_1$ is independently selected from a halogen atom or a halogenated hydrocarbyl group containing 1-5 carbon atoms, a silicon-containing hydrocarbyl group containing 1-5 carbon atoms or a cyano-substituted hydrocarbyl group containing 1-5 carbon atoms, and $R_2$ is independently selected from a group containing 0-5 carbon atoms; $X_1$ is independently selected from a phosphorus oxygen group or a phosphorus atom; $X_2$ is independently selected from an oxygen atom, a carboxylate group or a carbonate group.

2. The non-aqueous electrolyte for a lithium ion battery of claim 1, wherein the content of the compound A is 0.1%-5% based on the total mass of the non-aqueous electrolyte for a lithium ion battery being 100%.

3. The non-aqueous electrolyte for a lithium ion battery of claim 2, further comprising one or more of vinylene carbonate, vinylethylene carbonate and fluoroethylene carbonate.

4. The non-aqueous electrolyte for a lithium ion battery of claim 2, further comprising one or more of 1,3-propane sultone, 1,4-butane sultone and 1,3-propene sultone.

5. The non-aqueous electrolyte for a lithium ion battery of claim 4, further comprising a lithium salt and a non-aqueous organic solvent, wherein the lithium salt is selected from one or more of $LiPF_6$, $LiBF_4$, LiBOB, LiDFOB, $LiSbF_6$, $LiAsF_6$, $LiN(SO_2CF_3)_2$, $LiN(SO_2C_2F_5)_2$, $LiC(SO_2CF_3)_3$ or $LiN(SO_2F)_2$, the lithium salt accounts for 0.1%-15% of the total mass of the non-aqueous electrolyte; the non-aqueous organic solvent is a mixture of cyclic carbonate and chain carbonate, wherein the cyclic carbonate is selected from one or more of ethylene carbonate, propylene carbonate or butylene carbonate, and the chain carbonate is selected from one or more of dimethyl carbonate, diethyl carbonate, methyl ethyl carbonate or methyl propyl carbonate.

6. The non-aqueous electrolyte for a lithium ion battery of claim 1, wherein the group containing 1-5 carbon atoms is selected from a hydrocarbyl group, a halogenated hydrocarbyl group, an oxygen-containing hydrocarbyl group, a silicon-containing hydrocarbyl group or a cyano-substituted hydrocarbyl group; and the group containing 0-5 carbon atoms is selected from a hydrocarbyl group.

7. The non-aqueous electrolyte for a lithium ion battery of claim 6, wherein $R_1$ is independently selected from a fluorine atom, a methyl group, an alkylene group, an alkyne group, a phenyl group, a trimethylsiloxy group, a cyano group or a tricyanomethyl group.

8. The non-aqueous electrolyte for a lithium ion battery of claim 7, wherein the compound A is selected from compounds represented by formulas 11-12 and 14-18.

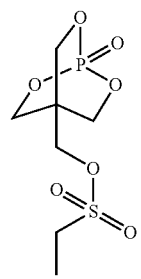

Formula 11

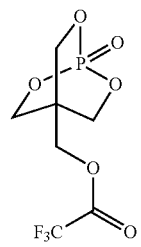

Formula 12

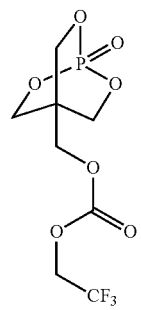

Formula 14

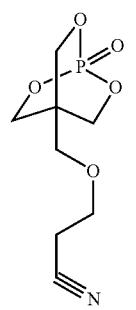

Formula 15

-continued

Formula 16

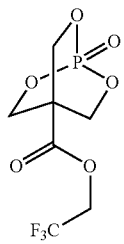 [SMILES: O=C(OCC(F)(F)F)C12COP(=O)(OC1)OC2]

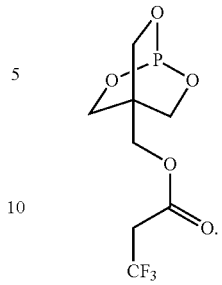

Formula 17

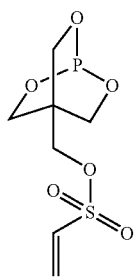

-continued

Formula 18

9. A lithium ion battery, comprising a positive electrode, a negative electrode and a separator interposed between the positive electrode and the negative electrode, wherein the lithium ion battery comprises the non-aqueous electrolyte for a lithium ion battery of claim 1.

10. The lithium ion battery of claim 9, wherein the positive electrode comprises a positive electrode active material selected from one or more of $LiCoO_2$, $LiNiO_2$, $LiMn_2O_4$, $LiCo_{1-y}M_yO_2$, $LiNi_{1-y}M_yO_2$, $LiMn_{2-y}M_yO_4$ or $LiNi_xCo_yMn_zM_{1-x-y-z}O_2$, and M is selected from one or more of Fe, Co, Ni, Mn, Mg, Cu, Zn, Al, Sn, B, Ga, Cr, Sr, V or Ti, $0 \leq y \leq 1$, $0 \leq x \leq 1$, $0 \leq z \leq 1$, $x+y+z \leq 1$.

11. The lithium ion battery of claim 9, wherein the positive electrode active material is selected from $LiFe_{1-x}M_xPO_4$, wherein M is selected from one or more of Mn, Mg, Co, Ni, Cu, Zn, Al, Sn, B, Ga, Cr, Sr, V or Ti, and $0 \leq x < 1$.

* * * * *